United States Patent Office 2,751,330
Patented June 19, 1956

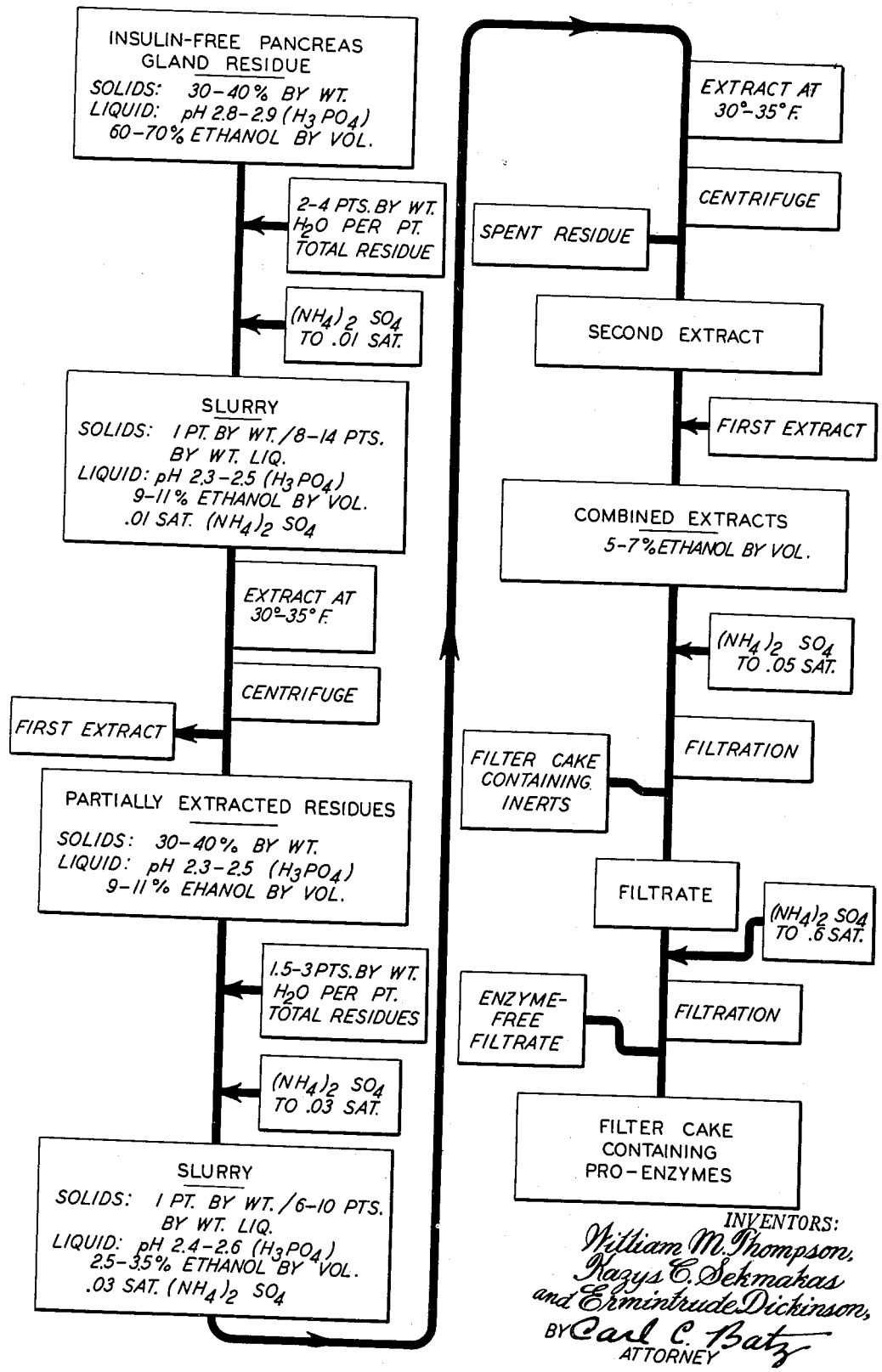

2,751,330

USE OF A SALT IN THE EXTRACTION SLURRY IN RECOVERING PROTEOLYTIC ENZYMES FROM PANCREAS GLAND MATERIAL

William M. Thompson, Kazys C. Sekmakas, and Ermintrude Dickinson, Chicago, Ill., assignors to Armour and Company, Chicago, Ill., a corporation of Illinois Application August 27, 1952, Serial No. 306,686

11 Claims. (Cl. 195—67)

This invention relates to the use of a salt in the extraction slurry in the recovery of proteolytic enzymes from pancreas gland material. The process of this invention has particular utility in preparing proteolytic enzymes in crystalline form from insulin-free pancreas gland residues, and especially in preparing crystalline trypsin.

The pancreas glands of mammals, particularly the pancreas glands of cattle, hogs, and sheep, are extracted commercially to obtain insulin and pancreatic enzymes. The enzymes are present in the fresh pancreas glands in the form of pro-enzymes or zymogens, which are the precursors of the active enzymes, such as trypsinogen and chymo-trypsinogen which are respectively the precursors of trypsin and chymo-trypsin. Other enzymes can also be obtained from pancreas glands such as desoxyribonuclease and ribonuclease.

To prevent any possibility of confusion, it is desired to point out that the terms "enzymes" and "proteolytic enzymes" are used in the following specification and claims to refer to both the pro-enzymes and the active enzymes. However, when the active and inactive forms of the enzymes are of importance, more specific terminology is employed.

The extraction of insulin from pancreas glands has been much more extensively investigated than the extraction of the proteolytic enzymes. The required conditions for the extraction of insulin from fresh pancreas glands have become well known. In order to prevent the insulin from being destroyed during the extraction, it is necessary to keep the enzymes inactive, that is, in the form of pro-enzymes. Also, to prevent contamination of the insulin extract, it is desirable to minimize the extraction of the pro-enzymes. Both of these objectives are accomplished by using an acidified extracting solvent containing water and from 50 to 85% by volume of a lower alcohol or ketone. The preferred water-miscible organic solvents for insulin are methanol, ethanol, and acetone. In the United States because of its availability, ethanol is used almost exclusively. The high concentration of the organic solvent is believed to be responsible for the insolubilization of the pro-enzymes, while the acidification of the extracting solvent is believed to prevent the activation of the pro-enzymes. The insulin extraction is ordinarily carried out at below pH 4. A number of acids can be satisfactorily employed to adjust the pH of the extracting solvent to the desired value, such as sulphuric, hydrochloric, phosphoric, oxalic, etc.

On the basis of recent discoveries, it is now known that the highest yields of insulin are obtained by using an extracting solvent containing from 60 to 70% ethanol, acidified to below pH 4 with phosphoric acid. The optimum extracting conditions for this system are probably obtained with a 65% ethanol concentration at pH 2.85 with phosphoric acid. The use of phosphoric acid in extracting insulin from pancreas glands is described in detail in co-pending application United States Serial No. 158,928, filed April 28, 1950, Now U. S. Patent No. 2,595,278. Also, on the basis of other recent discoveries, oxalic acid has been found to provide unique advantages in the extraction of insulin. The use of oxalic acid for this purpose is described in co-pending application United States Serial No. 244,281, filed August 29, 1951, now U. S. Patent No. 2,674,560.

In comparison with the extraction of insulin, the conditions for the extraction of proteolytic enzymes from pancreas glands are very poorly understood. Up to a few years ago, it was the practice to prepare crude enzyme mixtures from fresh pancreas glands for use in the tanning and textile industries. The pure crystalline enzymes were not recovered on a commercial basis. In fact, the pancreas gland residues resulting from the extraction of insulin were discarded, and no attempt was made to recover any enzyme preparations from these residues. This may possibly have been due to the belief that the high concentrations of organic solvents and/or the low pH's destroyed the enzymes. During the last few years, however, the insulin-free residues have been used as a source of enzyme preparations. Therefore, it is now definitely established that the enzymes are not destroyed but only precipitated, and can be converted back to their normal pro-enzyme state by reducing the concentration of organic solvent in the liquid portion of the residues to a sufficiently low value, that is, the volumetric ratio of organic solvent to water. A dilutent factor enters in to some extent, but in general it has been believed sufficient if the concentration of organic solvent is reduced to below about 20% by volume.

In spite of the fact that it has been known for several years that pro-enzymes could be extracted in the manner indicated above from pancreas gland residues, the performance of the pro-enzymes in a water-organic solvent-acid system is still based entirely on empirical observations, and therefore it is not possible to predict what results will be obtained by varying the components in the system. The commercial production of the enzymes has gone ahead without an adequate understanding of the extraction phenomena. This is probably because of the medical discoveries relating to the uses of crystalline trypsin, and to the pressing demand for other enzymes for clinical work. During the production of enzymes from pancreas residues, it has become clear that it would be desirable to improve the processes employed in a number of ways, but the means for producing the desired improvements have remained obscure. In general, it is desired to obtain a complete extraction of the pro-enzymes, particularly of trypsinogen, without the activation thereof, and with the extraction of a minimum amount of inert contaminants. Another general objective which has become apparent is that of preparing extracts which are particularly suited for the separation of the pro-enzymes (and the preparation of crystalline enzymes therefrom) by salting out procedures.

The method which has been most commonly employed to recover the enzymes from the pancreas residues is carried out by merely adding a sufficient quantity of water to the residues to reduce the concentration of the organic solvent to below 20%, and then maintaining the water-rich solvent in contact with the solids of the residues to solubilize and extract the enzymes. This method, however, has proved to have a number of disadvantages when applied to large scale commercial operations. In the first place, it has been found very difficult to carry the extraction of the enzymes to substantial completion unless a very large volume of water is added to the residues, in which case the relatively great dilution of the residues leads to an excessive extraction of inert contaminants. Secondly, the large volumes required for completing extraction of the residues present handling difficulties in filtration, etc., and require larger and more expensive equipment. Also, it has been found that the extract obtained by this method is not well adapted for recovery of the enzymes by salting out procedures, since uneconomically large amounts of the salts, such as ammonium sulphate and magnesium sulphate, are required; and the presence of varying amounts of the organic solvent presents control problems in carrying out the separations.

More recently, it has been discovered that the process could be considerably improved by subjecting the residues to distillation under reduced pressure, preferably after the addition of water, to remove substantially all of the organic solvent. This procedure provides an answer to a number of the problems discussed above, but is still not entirely satisfactory from a commercial standpoint.

In co-pending application United States Serial No. 262,704, filed December 21, 1951, there is disclosed a process in which the residues are extracted a plurality of times at decreasing concentrations of the organic solvent in the aqueous extracting solvent. As disclosed therein, the preferred procedure involves a double extraction; first at an organic solvent concentration below 15%, then at an organic solvent concentration below 5%. The discoveries upon which the present invention are based were made while seeking to improve still further the process disclosed in application Serial No. 262,704, and therefore are particularly applicable thereto. However, it will be apparent from the following discussion that the improvements disclosed herein are susceptible to a wide range of application, and can be advantageously employed in a large number of different processes for recovering proteolytic enzymes from enzymes-bearing pancreas gland solids.

Pancreas gland residues resulting from the extraction of comminuted pancreas glands with a concentrated water-miscible organic solvent for insulin acidified to below pH 4 with sulphuric acid present special problems in regard to the aqueous extraction of the enzymes, and especially if the acidity of the enzyme-extraction slurry is maintained below pH 4 solely with sulphuric acid. In this case, the extraction proceeds with difficulty and heat may be required to appreciably solubilize the enzymes unless special contact procedures are followed, such as the one described in co-pending application United States Serial No. 259,090, filed November 30, 1951, now U. S. Patent No. 2,686,148. It appears that one reason for the behavior of pancreas residue solids in aqueous slurries acidified solely with sulphuric acid is that the solid pieces of the residue are not extensively digested or broken down during the extraction. Conversely, it has been discovered that in slurries acidified with certain other inorganic or organic acids, such as phosphoric, oxalic, and hydrochloric acids, the solid pieces of glandular material tend to completely disintegrate. This digestion or breaking down of the enzyme-bearing glandular solids is believed to facilitate the extraction of the enzymes, and is therefore thought to be desirable. However, the relative formlessness or slimy character of slurries acidified with acids capable of bringing about the disintegration or digestion of the glandular solids has presented collateral problems which have tended to offset the advantage of using an acid or combination of acids in the slurry which result in a complete breakdown of the glandular solids. The separation of the liquid extract from the residue solids is complicated both as to the completeness of separation which can be achieved by centrifugation, and as to the time required for the centrifuging operation. Also, the slime of digested glandular material which passes through the centrifuge with the liquid extract makes subsequent filtration of the extract much more difficult and time-consuming. In particular, a gelatinous material, which is believed to be a breakdown product of collagen, has been found to carry over into the centrifugate and to seriously interfere with the separation of crystalline enzymes from the extract.

It is therefore a general object of this invention to provide a process for extracting proteolytic enzymes from pancreas gland material which permits the use of breakdown-inducing acids in the extraction slurry with their attendant advantages while at the same time substantially overcoming their collateral disadvantages, as described above. More specifically, it is an object of this invention to provide a method of increasing the cleanness of separation of the extract from the solid portions of the slurry by centrifugation, even though the slurry has been acidified with an acid or acids producing a substantially complete breakdown of the tissue structure. Another object of this invention is to provide an aqueous enzyme extract which is particularly suitable for the preparation of crystalline enzymes, and specifically in which the gelatinous material heretofore encountered is substantially eliminated, thus simplifying subsequent processing of the extract, such as filtration, etc. A still further object is to provide a process in which the extraction can be carried out at higher concentrations of inorganic solvent in the extraction slurry than have heretofore been possible. Further objects and advantages will appear as the specification proceeds.

As stated above, previous publications have indicated that proteolytic enzymes can be satisfactorily extracted from pancreas gland solids into an aqueous extracting solvent containing as high as 20% of an organic solvent such as ethanol. While this is true, our recent experimental work has enlarged the understanding of the solubilization phenomena. For example, in water containing approximately 11 to 14% ethanol fairly complete solubilization occurs; above this range a gradual diminution in solubility sets in which approaches zero at above 20 to 25%. However, it has now been discovered that the range of complete solubility is shifted upwardly with regard to the permissible concentration of organic solvent in the aqueous extraction slurry by having present in the slurry a small amount of an inorganic salt, such as ammonium sulphate. For example, the addition of ammonium sulphate in quantities equivalent to less than .05 saturation results in an increased enzyme solubility in the ethanol-water solutions sufficient to permit extractions to be satisfactorily carried out up to concentrations of around 25% organic solvent, and the concentration of complete insolubility is raised to around 40%. It has also been discovered that the presence of inorganic salt in the extraction slurry, such as ammonium sulphate and other salts having a similar effect on proteins, substantially achieves the other objects set out above.

As previously indicated, the starting material for the process of this invention is proteolytic enzyme-bearing pancreas gland material. Preferably, insulin-free pancreas gland residues are used. These residues contain solid pieces of glandular material generally about $1/16''$ to $3/8''$ in diameter suspended in an aqueous liquid having a pH below 4 and containing more than 50% by volume of an organic solvent such as methanol, ethanol, and acetone. These residues are usually separated from the supernatant in the insulin extraction process by centrifuging, which results in the production of residues containing about the same ratio of solids to liquid. Generally, the residues will contain about 30 to 40% by weight of solids, or in other words 60 to 70% of the residues will be liquid containing the high concentration of organic solvent. Somewhat dryer residues may sometimes be obtained, and these may possibly contain as little as 50% liquid. However, the residues as obtained from the insulin extraction process can be expected to contain a sufficiently uniform ratio of solids to liquids in a given plant operation so that it is not necessary to determine the ratio of liquids to solids in the residues for each batch of residues to satisfactorily carry out the following process.

The residues of the character described are formed into a slurry which can be circulated by the addition of water thereto. In general, a sufficient amount of water should be added to form a slurry in which the liquid portion contains between 2 to 25% by volume of the organic solvent found in the residues. Preferably, the slurry should contain about 8 to 14 parts of liquid to each part of solids by weight, and the optimum consistency of the slurry is obtained when it contains about 10 to 12 parts of liquid to each part of solids. An excellent procedure is to employ a double extraction, as described in copending application Serial No. 262,704, in which the first extraction is carried out at organic solvent concentrations of between 5 and 15% in the aqueous slurry. However, because of the innovation indicated above and subsequently to be described in detail, extractions can be satisfactorily carried out when the concentration of the organic solvent is considerably above 15%, say up to about 25%.

The slurry for the initial extraction step having the preferred ratio of liquid to solids and having the desired concentration of organic solvent in the liquid portion can be formed in a number of ways. The simplest and most direct method is to add water to the residues to dilute the liquid portion to the desired concentration of between 5 to 15%. For residues of the character ordinarily obtained in the insulin extracting process, as described above, this procedure is entirely satisfactory, and results in the production of a slurry with a satisfactory ratio of liquid to solids at the desired organic solvent concentration. For the purposes of this invention, it is preferred that all of the organic solvent be allowed to remain in the residues, so that it will be present in the slurry for reasons which will subsequently be described in detail. However, other or additional procedures can be employed to form the slurry involving the removal of a portion of the organic solvent from the residues. For example, part of the organic solvent can be removed from the residues by distillation under reduced pressure. Another method which can be used to form the slurry is to first wash the residues with water while maintaining the organic solvent concentration high enough to substantially prevent extraction of the enzymes, separate the residues by centrifugation, and add more water to the residues to form the slurry.

To prevent destruction of the enzymes during the extraction, it is desired to maintain the pH of the slurry on the acid side at least below pH 6.5. Preferably, the pH of the slurry is maintained below pH 4, which has been found to substantially prevent activation of the pro-enzymes. Usually it will not be necessary to add additional acid to the slurry to adjust it to the preferred pH values, because the residues from the insulin extraction will contain a sufficient quantity of acid for this purpose. In fact, because of the greater ionization in the water-rich slurry as compared to the organic solvent-rich residues, the pH of the slurry may actually be lower than the pH of the residues even though no additional acid is incorporated in the slurry. For example, with a residue in which the liquid portion is acidified at pH 2.8 to 3.0 with phosphoric acid, the dilution of the residues with 3 parts by weight of water to form a slurry containing about 11 parts by weight of liquid to each part by weight of solids will result in a slurry pH of between about 2.1 to 2.3. However, if desired, additional acids can be added to the slurry.

Phosphoric acid is the preferred acid for use in acidifying the extraction slurry. It has been found that phosphoric acid at pH's below 4 brings about a complete breakdown of the tissue structure. Oxalic acid is also desirable for this reason, as is hydrochloric acid, although the tissue disintegration obtained with hydrochloric acid is somewhat less complete than with phosphoric and oxalic acids. Residues resulting fom the extraction of pancreas glands with concentrated ethanol acidified with phosphoric acid are ideal for use in the process of this invention, although any type of insulin-free residues can be employed, including residues containing sulphuric acid. However, it will be understood that the aqueous extraction slurry formed from the residues should contain a sufficient amount of either phosphoric acid, oxalic acid, hydrochloric acid, or a mixture thereof, to bring about a pronounced breakdown or digestion of the tissue structure.

The advantages of this invention are most fully realized in conjunction with an extraction slurry formed by adding a small quantity of an inorganic salt or neutral salt such as ammonium sulphate, or a salt having equivalent properties, to the slurry prior to the extraction of the enzymes into the liquid portion of the slurry. The amount of salt which it is desirable to add depends somewhat on the concentration of the organic solvent in the slurry, and in general the lower the concentration of organic solvent, the higher is the permissible concentration of salt. In fact, in concentrations of organic solvent above 10 to 15%, the organic solvent itself has a substantial coalescing effect on the tissue material and thereby somewhat alleviates the problems associated with a complete disintegration of the pieces of glandular material. Therefore, the maximum advantage of the presence of a salt in the slurry is obtained at organic solvent concentrations of between about 2 to 15%, and the presence of a salt at organic solvent concentrations below about 10% is virtually a necessity for efficient commercial operation wherein the glandular tissue has undergone a complete breakdown.

In general, it can be stated that a sufficient amount of the inorganic salt should be added to produce substantial clotting of the tissue solids in cooperation with the organic solvent without precipitating the desired enzymes. However, the determination of the correct amount of the salt to employ is not difficult, since the salt can be incrementally added and its effect visually observed. The desired coalescing effect on the tissue material is obtained at considerably lower concentrations than those at which the enzymes begin to precipitate, and therefore there is an adequate margin of safety. For example, ammonium sulphate can be added to the slurry in amounts ranging from .4 saturation to .05 saturation. Preferably, when the liquid portion of the slurry contains from 2 to 15% of the organic solvent (in particular, ethanol) from .005 to .05 saturation is employed. By way of specific example, excellent results are achieved by incorporating an amount of ammonium sulphate equivalent to .01 saturation in the liquid portion of a slurry containing 10% ethanol by volume, while it has been found desirable to incorporate an amount of ammonium sulphate equivalent to .03 saturation when the liquid portion of a slurry contains about 3% ethanol by volume.

Instead of ammonium sulphate, other inorganic salts can be employed which are known to have comparable properties in regard to precipitating proteins from aqueous solutions. More specifically, other salts can be employed which precipitate globulins at lower salt concentrations than albumins in aqueous solutions containing minor proportions of organic solvents such as ethanol, methanol, and acetone. The class of salts referred to can also be designated as the salts which effect solubilization of globulins in dilute aqueous solutions. It has been suggested that one explanation of the effectiveness of such salts in producing the results described above is that the desired enzymes have an albumin-type solubility while the material which is at present regarded as a contaminant has a globulin-type solubility. Also, it has been found that inorganic salts of this type cooperate with the organic solvent in bringing about a coalescing or clotting of the digested tissue material, while leaving the enzymes in solution. In fact, it appears that the cooperation between the organic solvent and inorganic salts in such that the solubility of the enzymes is actually increased, while the solubility of the inert protein contaminants is actually decreased, or at least not appreciably increased. Among other specific salts which fall in the class giving the desired results can be mentioned: magnesium sulphate, sodium chloride, sodium acetate, sodium sulphate, sodium borate, and the like.

One theory which has been advanced to account for the observed phenomena is that the tissue-digesting acids produce a breakdown product of collagen, which is though to be the gelatinous or mucilaginous material heretofore interfering with subsequent processing of the extract. It is suggested that the presence of the salt in the slurry, possibly in conjunction with the organic solvent therein, has a marked effect on this gelatinous material, and causes it to form into small solid particles or nuclei around and on which the other disintegrated material can condense and collect, thereby producing the observed coalescing or clotting effect.

After the formation of the slurry in the manner described, it is desirable to subject it to agitation to bring about the suspension of the solids in the extracting solvent and to produce a uniform mixture. The slurry can then be passed to suitable extracting equipment. For example, a jacketed tank equipped with an agitator can be satisfactorily employed. Cooling fluid is circulated through the tank jacket to maintain the slurry at a sufficiently low temperature to prevent activation and destruction of the enzymes, and the agitator is operated to mainain the solids in suspension and to cause them to circulate within the tank. If the extraction of the residues is carried out in this manner, from 12 to 48 hours will usually be required. However, the extraction time can be shortened by various procedures. Preferably, the slurry is circulated through an impeller-type pump, as described in co-pending application United States Serial No. 259,090, filed November 30, 1951.

When operating with a relatively high concentration of organic solvent in the slurry (say 5 to 15% of the extracting solvent), it is desirable to maintain the slurry at a temperature below 45° F. during the extraction step. Preferably, the temperature of the slurry should be maintained below 40° F., and temperatures down to 25° F. can be employed. However, it is undesirable to bring about the formation of ice in the slurry, so that ordinarily the optimum range will be around 30 to 35° F.

Following the extraction step, the solids are preferably separated from the extract by centrifugation. It is at this point in the process that the presence of a salt in the slurry of the character described is virtually essential in order to permit a clean separation of the liquid extract and solids. When the solids are completely or even partially broken down by the action of the acid in the slurry, the centrifugation proceeds slowly and with difficulty. While the addition of a salt to the slurry prior to or during the extraction is desirable for the reasons explained above, if desired, the addition of the salt can be deferred until after the completion of the extraction. However, it will be understood that the salt must be added prior to the centrifugation and mixed sufficiently with the slurry to bring about a substantial clotting or coalescing of the slurry solids. If the salt is added immediately prior to the centrifugation, the amount to be employed is generally the same as set out for addition to the slurry before or during the extraction. The centrifugation can then proceed at a rapid pace while achieving a clean separation between the liquids and solids.

Then, if desired, the separated solids can be re-extracted. The glandular residues thus obtained, except for the digested condition of the solids, will be similar to the original insulin-free residue in that it will have approximately the same ratio of liquids to solids. These residues are preferably re-extracted once with an aqueous extracting solvent containing less than 5% by volume of the organic solvent. For example, excellent results can be obtained within the range of 2.5 to 3.5% of the organic solvent.

The slurry for the second extraction of the residues can be formed in the same manner as the slurry for the initial extraction, as described above. For the second extraction, however, it is preferable to add a minimum amount of water which will be sufficient to produce a slurry of a consistency which can be pumped. Usually, at least 6 parts of liquid to 1 part of solids will be required in the slurry to permit pumping, although up to 24 parts of liquid to 1 part of solids can be employed. Preferably, the slurry for the second extraction should contain between about 6 to 10 parts by weight of liquid to each part of solids.

Because of the lower concentration of ethanol or other organic solvent in the slurry for the second extraction, it may be desirable to employ a somewhat higher concentration of the salt in the slurry than during the first extraction. However, in general the amount and kind of inorganic salt to be employed corresponds to that set out above. At organic solvent concentrations of less than 5%, it has been found preferable to employ an amount of salt (specifically ammonium sulphate) equivalent to at least .02 saturation.

During the second extraction the slurry should be maintained at least at a pH below 6.5, and preferably at a pH below 4, as in the initial extraction step. Ordinarily, sufficient acid will be carried through the process from the insulin extraction, so that it will be unnecessary to add additional acid to the partially extracted residues in forming a slurry having a pH below 4. For example, the pH of the slurry for the second extraction when the insulin residues contain phosphoric acid to pH 2.85, would generally be between about pH 2.4 to 2.6. However, other acids can be added if desired, as in the initial extraction.

Because of the lower concentration of organic solvent in the second extraction, somewhat higher temperatures can be employed without destroying the enzymes. Probably the maximum temperatures which can be satisfactorily employed are around 50 to 55° F., but preferably the temperature of the slurry is maintained below 40° F. The optimum temperature conditions for the second extraction are 30 to 35° F.

The second extraction can be carried out by the same extracting technique and with the same apparatus as the initial extraction, that is, a jacketed, agitator-equipped tank can be employed, either alone or in conjunction with an impeller-type pump.

Following the second extraction, the residues can be re-extracted if desired, but this is not generally necessary, since two extractions are sufficient to recover all of the enzymes and a further extraction at a low organic solvent concentration will only result in the extraction of an undesirable amount of inert contaminants, while not greatly increasing the yield of enzymes.

The preferred procedure is to separate the spent residues from the second extract by centrifugation, and then to combine the first and second extracts for further processing. Here again, the presence of the salt in the slurry is of great importance, and if the salt has not already been added, it should be incorporated in the slurry and thoroughly mixed therewith prior to the centrifugation. The organic solvent concentration in the combined extracts is important, and should be between about 4 to 8% by volume. Preferably, the combined extracts should contain from about 5 to 7% by volume of the organic solvent. It has been discovered that by having the organic solvent concentration of the combined extracts within these ranges that the separation of the enzymes by salting out procedures is greatly facilitated, and a much smaller amount of the salt is required to achieve the separations. It has been found that a variation of organic solvent concentration of the order of from 1 to 4% within the range from 4 to 8% does not interfere with the control of the fractionation of the inert contaminants and enzymes to the extent that a sharp separation cannot be obtained, while at the same time the presence of the organic solvent in concentrations of from 4 to 8% assists the precipitation and supplements the action of the salt.

The preferred procedure for the recovery of the enzymes from the combined extract is to first add ammonium sulphate in an amount sufficient to precipitate out most of the inert contaminants while leaving the enzymes in solution, which are still almost entirely in their inactive form. It will be understood that the amounts of ammonium sulphate set out below are intended to include the ammonium sulphate which has already been added, and is carried over into the aqueous extract. Also, it will be understood that if other salts than ammonium sulphate have been incorporated in the slurry, that it will be preferred to use the same salt to carry out the subsequent fractionation procedures. In aqueous solution substantially free of organic solvent, chymotrypsinogen, which is the least soluble of the enzymes, is precipitated out at an ammonium sulphate concentration of between about .25 to .4 saturation. Therefore, when it was desired to recover the chymotrypsin-B it was the practice to first adjust the concentration of the extract to about .15 to .2 ammonium sulphate saturation to precipitate the inert contaminants, which were then separated before recovering the enzymes. It has now been discovered that when the extract contains from 4 to 8% organic solvent such as ethanol that the bulk of the inert contaminants are precipitated out by using an ammonium sulphate concentration as low as .025 saturation. Preferably, at least .05 ammonium sulphate saturation is employed to insure that the major portion of the inert contaminants will be precipitated. These inert contaminants are semi-soluble materials which if not precipitated at this point tend to clog the filter press and to pass through the press in the effluent and consequently to interfere with subsequent processing of the extract. However, as already indicated, the semi-soluble contaminants are satisfactorily precipitated by adjusting the ammonium sulphate concentration to at least .05 saturation. A considerable amount of the inert protein material, which would otherwise have carried over in dissolved form in the extract, will have already been removed in the centrifugation steps due to the presence of the ammonium sulphate in the slurry. However, it is not preferred to remove all of the inert contaminants in this way. For example, in the two-step extraction process described above, it is preferred that the combined extracts have an ammonium sulphate concentration of not over .03 saturation. Therefore, the saturation of the combined extracts can be raised, say to .05 saturation, to cause additional inert material to precipitate. Following their precipitation, the inert contaminants are separated by filtration, and then the filtrate is subjected to further treatment to recover the enzymes.

The ammonium sulphate concentration of the filtrate is then adjusted to the required value to precipitate the desired enzyme fraction. Preferably, the entire enzyme spectrum is precipitated at this point. Ribonuclease is the most soluble of the enzymes, precipitating out at between about .7 to .8 ammonium sulphate saturation in pure water. However, due to the presence of the controlled percentage of organic solvent in the extract, all of the enzymes can be precipitated by adjusting the ammonium sulphate concentration of the extract to a considerably lower value. It has been found that at least .5 ammonium sulphate saturation should be employed to insure the precipitation of the ribonuclease, while preferably the concentration should be adjusted to .6 ammonium sulphate saturation. It can thus be seen that a greater saving in the required quantity of ammonium sulphate is accomplished by having from 4 to 8% of the organic solvent in the extract. This is particularly important at this point in the recovery procedure because of the relatively large volumes. After the precipitation of the enzymes, they can be reworked in much smaller volumes, and therefore the required saturation of ammonium sulphate to precipitate the enzymes is of lesser economic importance.

The chymotrypsinogen and trypsinogen fraction is obtained in organic solvent-free water at between about .4 to .7 ammonium sulphate saturation. Therefore, if it is not desired to recover the ribonuclease, the chymotrypsinogen and trypsinogen enzymes can be precipitated by adjusting the ammonium sulphate saturation of the extract to a correspondingly lower saturation than those set out above for the precipitation of all of the enzymes.

The precipitated enzymes can be separated from the supernatant by filtration, and the filter cake reworked to obtain the separate enzymes by ammonium sulphate fractionation. Preferably, the enzymes are separated by ammonium sulphate fractionation and further purified by crystallization. During these procedures, but preferably after the enzymes are separated from each other, they are activated by well known procedures. Thus, active crystalline enzymes of standard potency and stabilized strength can be obtained as final products.

The preferred extraction process as described above down to the separation of the enzymes from the extract is set out in the flow sheet of the accompanying drawing. It will therefore be understood that this flow sheet is merely illustrative of a preferred embodiment of this invention, and is not intended to set out all of the procedural variations falling within the the scope thereof.

To more fully illustrate the details of this invention, it is desired to set out the following examples:

*Example I*

The following procedure has been found to be an excellent one for recovering crystalline trypsin from insulin-free pancreas gland residues containing from 30 to 40% by weight of solids and having a liquid portion acidified to pH 2.8 to 2.9 with phosphoric acid and containing about 65% by volume of ethanol.

The residue is suspended in cold tap water (5° C.) using 3 cc. of water per gram of residue. The resulting ethanol concentration will be approximately 10% and pH 2.2 ($H_3PO_4$). The slurry is extracted with an impeller-type pump at 5° C. The duration of the pump cycle will vary depending on the quantity of starting material, but in general three circulations of the slurry are sufficient for good results. Alternatively, the extraction can be carried out by passing the slurry to a brine-jacketed extractor tank equipped with an agitator and holding the slurry in the tank from 12 to 24 hours.

Prior to the extraction or, if desired, subsequent thereto, sufficient ammonium sulphate is added to the slurry to produce approximately 1% saturation and dissolution is effected by agitation using a propeller-type stirrer. After the completion of the extraction, 0.5% of Hyflo filter aid is added to the slurry and the material is separated in a pre-coated Bird centrifuge (preferably of the conical type).

The solid residue gained from the centrifugation of the slurry is suspended in cold tap water (2 cc. per g.) and the pH should be about 2.5. If adjustment is necessary to obtain this value, concentrated phosphoric acid should be used. The second extraction is accomplished by means of four circulations of the volume through an impeller-type pump. Prior to or after the second extraction, ammonium sulphate is added in an amount to produce approximately 3% saturation and dissolution is effected by agitation. The suspension is maintained at 5° C. and centrifuged as previously described. The residue from this step is discarded.

Both liquids from the extraction process are combined and sufficient ammonium sulphate is added to obtain 5% saturation (approximately 25 grams per liter of extract). After the addition of 1% Hyflo, the liquid is clarified by filtration through a pre-coated Sperry filter press. The precipitate is discarded. The residual liquid from the press is removed by washing with 5% saturation ammonium sulphate and the washed liquid is combined with the filtrate. To the combined filtrate and washed liquid is added ammonium sulphate on the basis of 455 grams per liter of combined liquid. Dissolution is effected by agitation with a propeller-type stirrer during the addition of ammonium sulphate followed by two circulations of the total volume through an impeller-type pump. After the addition of a minimal amount of Hyflo, the suspension is filtered through a pre-coated Sperry press. The press is blown with compressed air until completely dry.

The crude cake is suspended in 0° C. distilled water (5 cc. water per gram of cake, net Hyflo). After dissolution is complete, ammonium sulphate is added (175 grams per liter of suspension) and dissolved by agitation. The suspension is allowed to stand for 30 minutes at 5° C. and is then filtered through the Sperry press. The press is washed with an appropriate amount of 40% saturation ammonium sulphate solution. The cake is discarded. The filtrate and wash are combined and 155 grams ammonium sulphate per liter of filtrate is added. After dissolution of the salt, the suspension is allowed to stand for 30 minutes at 5° C. after which it is filtered on a Sperry press. The press is washed with a sufficient quantity of 65% saturation ammonium sulphate solution and is then blown dry with compressed air. The filtrate and wash liquid are discarded.

The purified cake from the above procedure is suspended in distilled water at 20° C. using the ratio of 1 gram of cake per 1.5 cc. water. After dissolution is complete, 0.5 cc. of saturated ammonium sulphate solution is added per gram of the cake obtained above, which contains the precipitated trypsinogen and chymotrypsinogen. This addition is made slowly while maintaining mechanical agitation. pH is adjusted to 5.0 using 5 N sodium hydroxide and the solution is kept 16 hours at 20° C. The crystalline chymotrypsinogen is separated at 20° C. by filtration using Büchner funnels, and the precipitate is dried after washing with 30% saturation ammonium sulphate solution. This cake may be stored at −5° C. for further processing.

The filtrate and wash liquid from the previous step are combined and diluted with distilled water (1.5 cc. water per gram of purified cake). The pH is adjusted to 3.0 with 5 N $H_3PO_4$, after which ammonium sulphate is added (340 grams per liter of solution). Upon completing the dissolution, the suspension is held for 30 minutes and then filtered. Büchner funnels may be used for this purpose. It is important that this cake be dry, since the next step involves a change from ammonium sulphate to magnesium sulphate.

The dried trypsinogen cake is shredded and held in a freezer compartment until the temperature reaches 5° C. A borate buffer solution (pH 9.0) is cooled to 15 to 18 C., and 1.5 cc. per gram of cake is mixed slowly into the cake at 0° C. until a thick paste is formed. A gradual addition is continued with agitation until the paste thins and then the remainder of the buffer solution is added while the solution is mechanically agitated. The temperature of the mixture should not exceed 15° C. throughout the buffer addition. After solution is complete, the pH is adjusted to 7.6 using either 5 N sodium hydroxide or 5 N phosphoric acid. While the mixture is agitated at 0° C., saturated magnesium sulphate solution is slowly added using 0.9 cc. saturated magnesium sulphate solution per cc. of buffer cake solution. The solution, after seeding with crystalline trypsinogen from a previous run is stored at 5° C. until crystallization is complete (maximum time required is two days). The crystals are readily separated by use of Büchner funnels. The step consists of gravity filtration until approximately two-thirds of the material is processed, after which a vacuum is applied intermittently. The residual liquid is removed from the crystalline cake which, after being completely dried, is stored at −5° C. until used for packaging.

*Example II*

The following example set out in flow sheet form illustrates the exact method of processing 2500 pounds of beef pancreas residue following insulin removal and containing 70% liquid portion (by weight), including phosphoric acid and ethanol:

| Step | Process | Volume (Gallons) |
|---|---|---|
| 1. Preparation of Crude Product. | Suspend residue in 1,150 gallons of cold tap water. Ethanol concentration should be 9–10% and pH 2.2. Temp. 5° C. Adjust pH to 2.2 if it varies above 2.3. | 1,400 |
| a. Extraction. | Extraction is accomplished with two-30-min. circulations through an impeller-type pump. Stir with propeller-type agitator for 15 min. between pump circulations. | |
| b. Separation of Tissue. | Add 65 pounds of $(NH_4)_2SO_4$ and agitate until dissolution is complete. Add 30 kg. of Hyflo. Pre-coat Bird centrifuge with 15 lbs. of Hyflo in 50 gal. of tap water. Temp. 5° C. | 1,150 |
| | Suspend residue in cold tap water and dilute to 800 gal. Circulate through Tri-clover pump 30 min. at 5° C. | 800 |
| | Check pH to 2.5. Adjust if above 2.6 with phosphoric acid. Add 175 lbs. of $(NH_4)_2SO_4$ to 0.03 saturation. Dissolve completely. | 1,650 |
| | Centrifuge as before. Temp. 5° C. | |
| | Discard | |
| c. Precipitation and Separation of Inert Material. | Add sufficient $(NH_4)_2SO_4$ so that 0.05 sat. is obtained. (0.2 lbs./gal. of extract.) Dissolve completely. Add 100 lbs. of Hyflo. Filter through pre-coated Sperry press. Wash press with 0.05 sat. $(NH_4)_2SO_4$ solution. | 1,750 |
| | Discard | |

| Step | Process | Volume (Gallons) |
|---|---|---|
| d. Precipitation and Separation of Crude Enzymes. | Add 3.8 lbs. of (NH₄)₂SO₄ per gal. Dissolve by agitation then follow two circulations through impeller pump. Temp. 5° C. Add 15 lbs. Hyflo and filter through pre-coated Sperry press. | 1,700 |
| | Discard | |
| 2. Purification and Crystallization of Trypsin. | Suspend crude cake (approx. 23 kg.) in cold distilled water (5 cc. per gram). Dissolve completely at 5° C. pH at 3.0–3.2. | 32 |
| a. Precipitation of Contaminant Substances. | Add 175 g. of (NH₄)₂SO₄ per liter of suspension. Agitate 15 min. and hold 30 min. at 5° C. Filter. Wash cake with sufficient 0.4 sat. (NH₄)₂SO₄ solution. | 30 |
| | Discard | |
| b. Precipitation of Trypsinogen and Chymo-Trypsinogen. | Add 155 g. (NH₄)₂SO₄ per liter of filtrate. Agitate 15 min. and hold 30 min. Temp. 5° C. Filter. Wash press with 0.65 sat. (NH₄)₂SO₄ solution. Dry cake with compressed air. | 28 |
| | Discard | |
| c. Crystallization of Chymo-Trypsinogen. | 1. Dissolve cake (approx. 7.0 kg. in distilled water (1.5 cc. per g. of purified cake from 2b. Temp. 20° C.<br>2. Add 0.5 cc. of sat. (NH₄)₂SO₄ solution per g. of cake from 2b. Add slowly with continuous agitation.<br>3. Adjust pH to 5.0 with 5 N NaOH.<br>4. Hold overnight at 20° C. (16 hrs.) | 4.5 |
| | Filter on Buchner funnel at 20° C. Wash ppt. with small amount of 0.3 sat. (NH₄)₂SO₄ solution. | 4.3 |
| | Hold chymotrypsin at —5° C. or discard. | |
| d. Precipitation of Purified Trypsinogen. | Add 1.5 cc. of dist. H₂O per g. of cake obtained in step 2b. Adjust pH of solution to 3.0 with 5 N H₃PO₄. Add 340 g. of (NH₄)₂SO₄ per liter of combined solution. Stir 15 min. and hold 30 min. Filter and dry completely. Temp. 20° C. | 9.5 |
| | Discard | |
| e. Crystallization of Trypsin. | 1. Shred dry cake and cool to 5° C.<br>2. Cool 1.5 cc. of pH 9.0, 0.4 M borate buffer per gm. of cake to 15–18° C.<br>3. At 0° C. add small amount of buffer to cake and form paste.<br>4. Add buffer slowly to paste with agitation until solution is completed.<br>5. Adjust pH to 7.6 with 5 N H₃PO₄ or 5 N NaOH, if necessary.<br>6. Add 0.9 cc. sat. MgSO solution per cc. of buffer-cake solution with agitation. Filter, if necessary.<br>7. Seed with crystalline trypsin. | 4.0 |
| | Hold at 5° C. until crystallization is complete. | |
| f. Separation of Crystalline Trypsin. | Filter on Buchner funnel at 5° C. | 3.8 |
| | Store at —5° C.    Discard | |

*Example III*

If it is desired to recover all of the enzymes from the insulin-free pancreas gland residues, the procedure of Example I can be followed down to the recovery of the filter cake containing the crude enzymes. Thereafter, the following procedure is recommended.

Dissolve the filter cake containing the crude enzymes in 5 cc. of distilled water per gram of cake, and adjust the pH to 2.8 to 3.3 if there is a deviation from this range. Add 150 g. ammonium sulphate per liter of solution to adjust the concentration to 0.4 slurry ammonium sulphate saturation. Make the addition slowly and with vigorous agitation. Continue the agitation for 15 minutes and allow the suspension to settle for an additional 30 minutes before starting the filtration. Then filter the suspension. Wash the filter cake with 10 liters of a 0.4 saturated ammonium sulphate solution. Hold the filter cake, containing the chymotrypsinogen-B at 23° F. for further processing.

Adjust the concentration of the filtrate to 0.7 ammonium sulphate saturation by adding about 200 g. of ammonium sulphate per liter of filtrate. The addition should be made in the usual manner set out above. Agitate the suspension for 15 minutes and allow it to flocculate over an additional 30 minute period. Filter the material and remove the filter cake, containing the crude trypsinogen and chymo-trypsinogen, and hold it at a temperature of 65° F. for further processing. Adjust the concentration of the filtrate to 0.8 ammonium sulphate saturation by adding about 110 g. of ammonium sulphate per liter of filtrate. Agitate the suspension for 15 minutes and allow it to flocculate over an additional 30 minute period. Filter the material and hold the filter cake containing the crude ribonuclease at 23° F. for further processing.

Dissolve the precipitate of crude trypsinogen and chymo-trypsinogen in 1.5 cc. of distilled water per gram of cake. Add 0.5 cc. of saturated ammonium sulphate per gram of cake, slowly, while the material is agitated. Adjust the pH of the solution to 5.0 with 5 N sodium hydroxide. Seed the solution with chymo-trypsinogen crystals, and hold it for 16 hours at 65° F. for crystallization of the chymo-trypsinogen. Separate the crystalline material by vacuum filtration, and hold the chymotrypsinogen crystals at 23° F. for further processing.

To the filtrate from the last step add the following: (1) 1.5 cc. of distilled water per gram of cake and (2) 1.5 cc. of saturated ammonium sulphate solution per gram of cake. Agitate for 15 minutes and allow 30 minutes for settling. Filter the suspension and discard the precipitate. Add 150 g. of ammonium sulphate per liter of filtrate. Subject the suspension to the previously described agitation and settling periods, and filter the material. Dry the filter cake containing the trypsinogen material as completely as possible in preparation for crystallization. Cool the trypsinogen cake to 45° F. Cool a borate buffer solution (pH 9.0) to 60° F., and mix 1.5 cc. of the solution per gram of the trypsinogen cake with minimal agitation at 32° F. Maintain the temperature below 50° F. at all times. Allow the material to stand 16 hours at 32° F. at pH 7.6. Add 1 cc. of saturated magnesium sulphate solution per cc. of buffer cake solution slowly with continuous agitation. Allow the solution to stand 3 to 4 hours at 32° F. If gelatinization appears in the standing solution, or if it is of dark color or dingy appearance, filter the solution. After the removal of the gelatinous material, or if the solution was originally of tan or light color seed the solution with crystalline trypsin and hold it at 5° C. for 48 hours for crystallization. Separate the crystalline trypsin by filtration. If the crystalline solution appears gummy or gelatinous, subject it to centrifugation, and suspend the precipitate in a minimal amount of pH 9.0 borate buffer solution containing an equal volume of saturated magnesium sulphate solution. Filter this suspension and dry it as much as possible. Store the dry filter cake at 23° F. The crystalline trypsin can then be further purified if desired by dialysis to remove the borate buffer salt, and then packaged in vials.

While in the foregoing specification this invention has been described in considerable detail for purpose of illustration specific embodiments thereof, it will be apparent to those skilled in the art that many of the details set forth can be varied widely without departing from the spirit of the invention.

We claim:

1. In a process for recovering pancreatic enzymes of the group consisting of ribonuclease and the proteolytic pro-enzymes alpha chymotrypsinogen, chymotrypsinogen B and trypsinogen from pancreas gland material comprising enzyme-bearing glandular solids in intimate association with an acidified liquid containing water and at least 50% by volume of an organic solvent selected from the group consisting of methanol, ethanol, and acetone, the steps of forming a slurry containing said solids in intimate association with a liquid containing sufficient water in admixture with said organic solvent to solubilize said enzymes and acidified with an acid selected from the group consisting of phosphoric acid, hydrochloric acid, and oxalic acid, extracting said enzymes into the liquid portion of said slurry while digesting said solids, incorporating in said slurry an inorganic salt to produce clotting of the digested solids, said salt being selected from the group consisting of ammonium sulphate, magnesium sulphate, and sodium chloride, and then separating said liquid portion by centrifugation from the solids in said slurry.

2. In a process for recovering pancreatic enzymes of the group consisting of ribonuclease and the proteolytic pro-enzymes alpha chymotrypsinogen, chymotrypsinogen B and trypsinogen from pancreas gland material comprising enzyme-bearing glandular solids in intimate association with an acidified liquid containing water and at least 50% by volume of an organic solvent selected from the group consisting of methanol, ethanol, and acetone, the steps of forming a slurry containing said solids in intimate association with a liquid containing water in admixture with from 2 to 25% by volume of ethanol, said liquid being acidified to below pH 4 with an acid selected from the group consisting of hydrochloric acid, phosphoric acid, and oxalic acid, said slurry also having incorporated therein a salt selected from the group consisting of ammonium sulphate, magnesium sulphate, and sodium chloride, extracting said enzymes into the liquid portion of said slurry while digesting said solids, and then separating said liquid portion by centrifugation from the solids in said slurry.

3. In a process for recovering pancreatic enzymes of the group consisting of ribonuclease and the proteolytic pro-enzymes alpha chymotrypsinogen, chymotrypsinogen B and trypsinogen from residues resulting from the extraction of insulin from pancreas glands, said residues comprising enzyme-bearing glandular solids in intimate association with a liquid consisting of a mixture of water and ethanol acidified to a pH below 4 with phosphoric acid, said ethanol representing 50 to 85% by volume of said liquid, the steps of forming a slurry from said residues containing said solids in intimate association with a liquid, said liquid comprising a mixture of water and ethanol acidified to below pH 4 with phosphoric acid and the ethanol therein being present in the amount of 2 to 15% by volume, extracting said enzymes into the liquid portion of said slurry while digesting said solids, incorporating in said slurry an inorganic salt to bring about a coalescence of the digested solids without precipitating the extracted enzymes, said salt being selected from the group consisting of ammonium sulphate, magnesium sulphate, and sodium chloride, and then separating said liquid portion by centrifugation from the solids in said slurry.

4. In a process for recovering pancreatic enzymes of the group consisting of ribonuclease and the proteolytic pro-enzymes alpha chymotrypsinogen, chymotrypsinogen B and trypsinogen from residues resulting from the extraction of insulin from pancreas glands, said residues comprising enzyme-bearing glandular solids in intimate association with a liquid consisting of a mixture of water and ethanol acidified to a pH below 4 with phosphoric acid, said ethanol representing 50 to 85% by volume of said liquid, the steps of forming a slurry from said residues containing said solids in intimate association with a liquid comprising a mixture of water and ethanol acidified to below pH 4 with phosphoric acid and said ethanol forming about 2 to 10% by volume of said mixture, extracting said enzymes into the liquid portion of said slurry while digesting said solids, incorporating in said slurry ammonium sulphate to bring about a coalescence of the digested solids, and then separating said liquid portion by centrifugation from the solids in said slurry.

5. In a process for recovering pancreatic enzymes of the group consisting of ribonuclease and the proteolytic pro-enzymes alpha chymotrypsinogen, chymotrypsinogen B and trypsinogen from residues resulting from the extraction of insulin from pancreas glands, said residues containing enzyme-bearing glandular solids and aqueous ethanol acidified to below pH 4 with an acid selected from the group consisting of phosphoric acid, hydrochloric acid, and oxalic acid, the steps of forming a slurry from said residues, containing said solids in intimate association with a liquid comprising a mixture of water with from 2 to 15% by volume of ethanol, said mixture being acidified to below pH 4 with an acid selected from the group consisting of phosphoric acid, oxalic acid, and hydrochloric acid, extracting said enzymes into the liquid portion of said slurry while digesting said solids, incorporating in said slurry ammonium sulphate to bring about a clotting of the digested solids, said ammonium sulphate being added to said slurry in an amount producing an ammonium sulphate saturation between about .005 to .4 ammonium sulphate saturation, and then separating said liquid portion by centrifugation from the solids in said slurry.

6. In a process for recovering pancreatic enzymes of the group consisting of ribonuclease and the proteolytic pro-enzymes alpha chymotrypsinogen, chymotrypsinogen B and trypsinogen from residues resulting from the extraction of insulin from pancreas glands, said residues containing enzyme-bearing glandular solids and aqueous ethanol acidified to below pH 4 with an acid selected from the group consisting of phosphoric acid, hydrochloric acid, and oxalic acid, the steps of forming a slurry from said residues containing said solids in intimate association with a liquid comprising a mixture of water with from 2 to 25% by volume of ethanol, said liquid being acidified to below pH 4 with an acid selected from the group consisting of phosphoric acid, oxalic acid, and hydrochloric acid, adding ammonium sulphate to said slurry to produce an ammonium sulphate saturation therein of between about .005 to .05 ammonium sulphate saturation, then extracting said enzymes into the liquid portion of said slurry while digesting said solids, and separating said liquid portion by centrifugation from the solids in said slurry.

7. In a process for recovering pancreatic enzymes of the group consisting of ribonuclease and the proteolytic pro-enzymes alpha chymotrypsinogen, chymotrypsinogen B and trypsinogen from residues resulting from the extraction of insulin from pancreas glands, said residues comprising enzyme-bearing glandular solids in intimate association with a liquid consisting of a mixture of water and ethanol acidified to a pH below 4 with phosphoric acid, said ethanol representing 50 to 85% by volume of said liquid, the steps of forming a slurry from said residues containing said solids in intimate association with a liquid comprising a mixture of water with from 2 to 10% by volume of ethanol acidified to below pH 4 with phosphoric acid, extracting said enzymes into the liquid portion of said slurry while digesting said solids, adding to said slurry sufficient amount of ammonium sulphate to produce a saturation therein of between about .005 to .05 ammonium sulphate saturation, and then separating said liquid portion by centrifugation from the solids in said slurry.

8. In a process for extracting pancreatic enzymes of the group consisting of ribonuclease and the proteolytic pro-enzymes alpha chymotrypsinogen, chymotrypsinogen B and trypsinogen from residues resulting from the extraction of insulin from comminuted pancreas glands with an extracting solvent containing from 50 to 85% by volume of ethanol acidified to below pH 4 with phosphoric acid, the steps of adding water to said residues to form an extracting solvent in contact with said residues containing from 5 to 15% by volume of said ethanol, extracting a part of the enzymes from the glandular solids into said extracting solvent, while digesting said solids, incorporating in said slurry ammonium sulphate in an amount to produce a saturation therein of between about .005 to .03 saturation, separating the digested, partially extracted solids from the extracting solvent by centrifugation, adding water to the separated solids to form another extracting solvent in contact with said residues containing less than 5% by volume of said ethanol, extracting the bulk of the remaining portion of enzymes in said glandular solids into said extracting solvent, adjusting the ammonium sulphate saturation of said second-mentioned extracting solvent to between about .02 to .05 ammonium sulphate saturation, separating the spent residues from said second-mentioned extracting solvent, then combining both of said extracting solvents to form an extract containing from 4 to 8% by volume of ethanol, adjusting the ammonium sulphate concentration of said combined extracts to at least .05 saturation to precipitate the inert contaminants in said extract, separating the precipitated material by filtration, adjusting the ammonium sulphate concentration of said filtrate to at least .6 ammonium sulphate saturation to precipitate the enzymes therein, and recovering the precipitated enzymes.

9. In a process for preparing pancreatic enzymes of the group consisting of ribonuclease and the proteolytic pro-enzymes alpha chymotrypsinogen, chymotrypsinogen B and trypsinogen from residues resulting from the extraction of insulin from pancreas glands, said residues containing enzyme-bearing glandular solids and a water-miscible organic solvent for insulin, the steps of forming a slurry containing said solids in intimate association with a liquid consisting of water in admixture with said organic solvent, acidifying said slurry with an acid to solubilize said enzymes while disintegrating said solids, incorporating in said slurry a neutral salt to coalesce the disintegrated solids, and then separating the enzyme extract from the coalesced solids.

10. The process of claim 9 in which said neutral salt is selected from the group consisting of ammonium sulfate and magnesium sulfate.

11. The process of claim 9 in which said acid is selected from the group consisting of phosphoric acid, hydrochloric acid and oxalic acid.

References Cited in the file of this patent
UNITED STATES PATENTS

| Number | Name | Date |
|---|---|---|
| 2,524,658 | Fredericksen | Oct. 3, 1950 |
| 2,529,152 | Grant | Nov. 7, 1950 |
| 2,571,126 | Frederickson | Oct. 16, 1951 |
| 2,573,099 | Frederickson | Oct. 30, 1951 |
| 2,595,278 | Maxwell | May 6, 1952 |
| 2,637,680 | Peterson | May 5, 1953 |
| 2,686,148 | Thompson | Aug. 10, 1954 |

FOREIGN PATENTS

| 618,174 | Great Britain | 1949 |
|---|---|---|

OTHER REFERENCES

Northrop et al.: Crystalline Enzymes, 1948, pages 96–99.